(12) United States Patent
Broido

(10) Patent No.: US 7,882,268 B1
(45) Date of Patent: Feb. 1, 2011

(54) UDP TRANSPORT FOR WEB SERVICES

(75) Inventor: Andre Broido, Mountain View, CA (US)

(73) Assignee: Google Inc., Mountain View, CA (US)

( * ) Notice: Subject to any disclaimer, the term of this patent is extended or adjusted under 35 U.S.C. 154(b) by 281 days.

(21) Appl. No.: 11/701,608

(22) Filed: Feb. 1, 2007

(51) Int. Cl.
*G06F 15/16* (2006.01)

(52) U.S. Cl. ................................ 709/245

(58) Field of Classification Search ............... 709/220, 709/201, 219, 217, 218, 249, 238, 232, 224, 709/226, 203, 245; 707/501, 505, 506, 530, 707/513; 715/215, 735, 736, 740; 370/230, 370/231, 232, 352, 389, 229, 254, 360; 705/5, 705/6, 1, 28, 26, 27, 56, 35, 37, 44, 10, 14, 705/30, 7

See application file for complete search history.

(56) References Cited

U.S. PATENT DOCUMENTS

| 6,085,186 | A* | 7/2000 | Christianson et al. | 707/3 |
| 6,526,450 | B1* | 2/2003 | Zhang et al. | 709/245 |
| 2002/0010798 | A1* | 1/2002 | Ben-Shaul et al. | 709/247 |
| 2003/0050959 | A1* | 3/2003 | Faybishenko et al. | 709/202 |
| 2004/0044791 | A1* | 3/2004 | Pouzzner | 709/245 |
| 2004/0199664 | A1 | 10/2004 | Feldman et al. | |

OTHER PUBLICATIONS

Cidon, I., et al. Hybrid TCP-UDP transport for web traffic. IEEE International Performance, Computing and Communications Conference, 1999.
Combs, H., et al. SOAP-over-UDP [online], [retrieved on Dec. 28, 2006]. Retrieved from the MSDN Library using Internet <URL: http://msdn.microsoft.com/library/default.asp?url=/library/en-us/dnglobspec/html/soap-over-udp.asp>.

* cited by examiner

*Primary Examiner*—Larry Donaghue
*Assistant Examiner*—Mark O Afolabi
(74) *Attorney, Agent, or Firm*—Fish & Richardson P.C.

(57) ABSTRACT

Systems, methods, and computer program products for routing of search requests and replies using UDP transport are provided. In some implementations, a method is provided. The method includes receiving a query at a client, converting the query into the form of a domain name in a DNS format, transmitting the query as a DNS request for a DNS record to a first server, where the DNS request is transmitted in the payload of a UDP packet, appending information identifying the client and the first server to the UDP packet, transmitting the UDP packet from the first server to one or more second servers to respond to the query, generating one or more DNS replies in response to the query, and transmitting the one or more DNS replies to the client in the payload of one or more UDP packets, the transmitted replies bypassing the first server.

24 Claims, 3 Drawing Sheets

UDP TRANSPORT FOR WEB SERVICES

BACKGROUND

This specification relates to routing data using transport based on a stateless or connectionless protocol, e.g., a User Datagram Protocol (UDP) transport.

Generally, web services use Transmission Control Protocol (TCP) to communicate data using one or more networks. TCP is a communications protocol for a transport layer in an Open Systems Interconnection (OSI) communication model. The transport layer receives service requests from an application layer and forwards service requests with appended header information to a network layer.

TCP facilitates the transmission of large amounts of data by dividing the data into packets prior to transmission. The packets are transmitted with sequencing data and are reassembled upon receipt at a destination. TCP also provides congestion throttling and reliable data transfer through retransmission of lost packets. However, the reliability achieved with TCP transport results in latency and network loading.

UDP is another protocol for the transport layer in the OSI model. UDP is typically used with applications (e.g., real-time online games, streaming media, and Voice over IP) which are time-sensitive and require small amounts of data to be transmitted at a time. For UDP transport, packets or datagrams are transmitted without sequencing data. UDP is a connectionless protocol: data are transmitted between the client and the server without establishing a connection prior to transmission. Because there is no error checking for the packets, UDP transmitted packets can be lost or delivered out of order. However, UDP transmissions require lower network overhead and have reduced latency relative to TCP.

Typically, search queries and responses are sent over TCP. This may involve multiple round trips to Domain Name System (DNS) and Hypertext Transfer Protocol (HTTP) servers, and the search query is prone to timeouts caused by high round-trip time (RTT) or packet loss.

SUMMARY

Systems, methods, and computer program products for routing of a query using UDP transport are provided. In general, in one aspect, a method and a computer program product, respectively, are provided. The method and computer program product include receiving a query at a client, the query including at least one term, converting the query into the form of a domain name in a DNS format, the converted query including the at least one term prefixed to a domain suffix associated with a first server, transmitting the query as a DNS request for a DNS record to the first server associated with the domain suffix, where the DNS request is transmitted in the payload of a UDP packet, appending information identifying the client and the first server to the UDP packet, transmitting the UDP packet from the first server to one or more second servers to respond to the query, generating one or more DNS replies in response to the query, and transmitting the one or more DNS replies from the one or more second servers to the client in the payload of one or more UDP packets, the transmitted replies bypassing the first server.

In general, in one aspect, a method and a computer program product, respectively, are provided. The method and computer program product include receiving a query at a client, the query including at least one term, converting the query into the form of a domain name in a DNS format, the converted query including the at least one term prefixed to a domain suffix associated with a destination server, transmitting the query as a DNS request for a DNS record to the destination server associated with the domain suffix in the converted query, where the DNS request is transmitted in the payload of a UDP packet including the client's IP address and port number, and receiving query results in a DNS reply, where the query results are provided in the payload of one or more UDP packets and where the DNS reply is received from a server different from the destination server.

In general, in one aspect, a method and a computer program product, respectively, are provided. The method and computer program product include, at a client, encoding a query into the form of a domain name in a DNS format, the domain name including a domain suffix associated with a destination server, resolving the domain name to determine an IP address for the destination server associated with the domain suffix, transmitting a UDP packet to the IP address, the UDP packet containing the query as a DNS request for a DNS record for the domain name, the UDP packet containing an IP address and a port number for the client, and receiving query results in a DNS reply to the DNS request at the client from a query server processing the query.

In general, in one aspect, a method and a computer program product, respectively, are provided. The method and computer program product include receiving at a first server a query from a client, the query being formatted as a domain name in a DNS format and received in a UDP packet as a DNS request, adding information identifying the client and the first server to the UDP packet, and forwarding the UDP packet to a second server, where the second server generates a DNS reply in response to the query and transmits the DNS reply to the client in the payload of one or more UDP packets, the transmitted reply bypassing the first server.

In general, in one aspect, a system is provided. The system includes a client operable to format a query as a domain name in a DNS format, the client being further operable to transmit the query as a DNS request for a DNS record in a UDP packet to a first server, a first server operable to receive the DNS request from the client, the first server being operable to forward the DNS request to a second server to respond to the client query, and one or more second servers operable to receive the DNS request, each second server being operable to respond to the query with a DNS reply transmitted to the client as one or more UDP packets without passing through the first server.

Particular embodiments of the subject matter described in this specification can be implemented to realize one or more of the following advantages. A user can perform rapid web searches and short data transfers (e.g., send or receive e-mail or download small files) conducted as DNS queries and replies using UDP transport. Using UDP transport provides reduced latency and network load relative to using TCP transport. In particular, search latency can be reduced for users exposed to high round-trip times and bandwidth constraints. Subsequent web searches from a client can be directed to a particular search server, eliminating the need for further domain name resolution. Search queries can easily be forwarded to several search servers. Additionally, UDP transport allows graceful degradation to standard DNS service in case of attack or overload.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
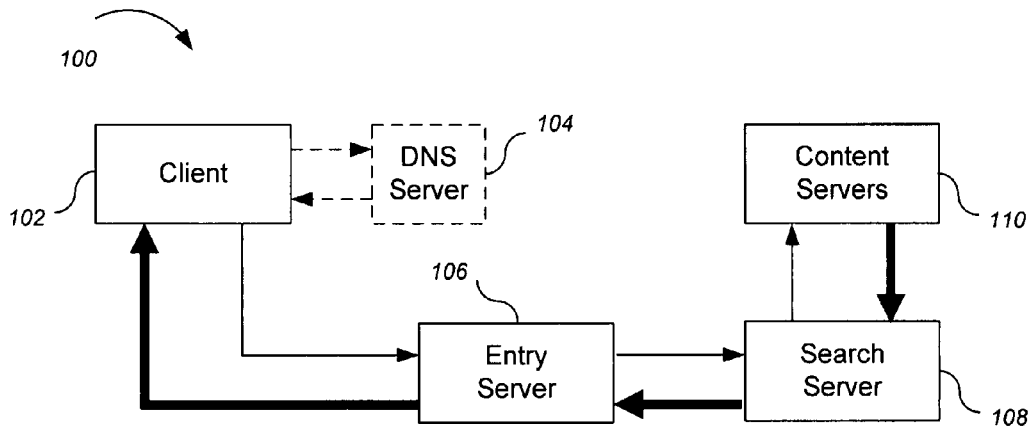
FIG. 1 is a block diagram of a system illustrating prior art of routing a search query using TCP transport.

FIG. 1 is an example block diagram of a system 100 illustrating prior art of routing a search query using TCP transport. A user of a client 102 (e.g., a laptop or desktop computer) initiates a search. For example, the user can enter one or more search terms into a browser application running on the client 102. The search is sent to a particular search engine, using the domain name of the search engine, to conduct the search.

If the client 102 does not know the Internet Protocol (IP) address of an entry server 106 for the domain name, a DNS server 104 can resolve the domain name, for example, www.google.com. For example, the user's Internet Service Provider (ISP) can provide a DNS server or nameserver to resolve domain names for the ISP's clients. Resolution of a domain name may require recursion involving other DNS servers.

Once the domain name is resolved, the user's browser application initiates a TCP connection with the entry server 106. The client 102 then forwards the query, including the search terms, to the entry server 106. The entry server 106 can forward the query to a search server 108. In some search engine implementations, there are multiple search servers 108, and the entry server 106 selects a particular search server to receive the query. When responding to the query, the search server 108 identifies particular content servers 110 as those having content related to the query. A query reply can identify multiple content servers 110 as having content potentially related to the query.

The query reply by the search server 108 is routed back through the entry server 106. The entry server 106 sends a reply to the query back to the client 102. The query reply is segmented into one or more TCP packets. Each TCP packet includes two parts, one for header information and the other for content. The TCP header information is used to reassemble the packets containing content data into the correct sequence. The browser waits to receive an indication that the transmission is complete before rendering reply content. The user's browser may open more TCP connections to download images or other data to accompany the reply content. The user's browser then renders the reply content (i.e., search results), including, for example, Uniform Resource Locator (URL) links to further information, anchor text (i.e., small amounts of text from the web pages pointed to by the URLs), images, and advertising.

The user, after reviewing the rendered reply content, can select one of the URL links to view further information. If a URL link is selected, the DNS server 104 (e.g., the nameserver provided by the user's ISP) can resolve the chosen URL's domain name to an IP address in order to provide content associated with the URL to the user (e.g., using a new TCP connection with the destination location).

Figure 2:
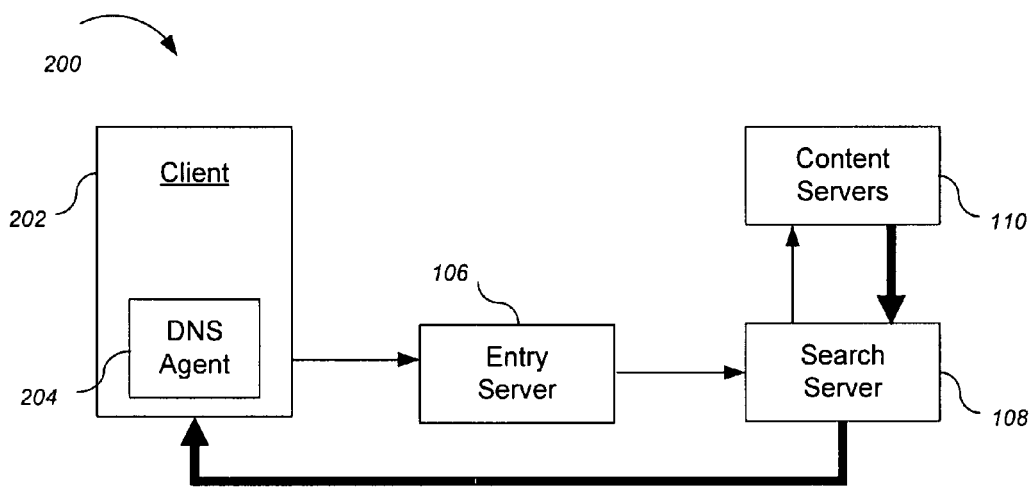
FIG. 2 is a block diagram illustrating routing of a search query using UDP transport.

FIG. 2 is an example block diagram of a system 200 illustrating routing of a search (e.g., a web search) query using UDP transport. The user of a client 202 initiates a search by entering one or more search terms as input to an application running on the client 202. For example, the user can enter the search terms in a quick search field on a toolbar installed in the client browser. The query is converted by a DNS agent 204, for example, a browser or a browser plug-in (e.g., a search engine toolbar), into the form of a domain name in a DNS format. The formatted query can include a domain suffix associated with an entry server 106, and the search terms can be prefixed to the domain suffix, as will be described in more detail below. The portion of the domain name specifying the domain suffix can be resolved by the DNS agent 204, which may require several recursion operations. In some implementations, the formatted query is transmitted to designated DNS servers (e.g., ISP nameservers) which are configured to accept prefixed domain names. These designated DNS servers can be configured to accept the formatted query without the domain suffix. In some implementations, the query is converted to the format of an application-layer protocol other than DNS, for example, HTTP. In some implementations, the query is encrypted or a digital signature is appended to the query to certify that the query request is made by a legitimate user.

The query is transmitted to the entry server 106 as a DNS request in the payload of a UDP packet. If the entry server 106 has a cached response to the query, the entry server can serve the search request directly. Otherwise, the entry server 106 appends both the client and entry server identification information to the DNS request in the UDP payload. In some implementations, the appended information includes the IP addresses and port numbers of both the client and the first server. This UDP packet is forwarded from the entry server 106 to the search server 108. A search server 108 responding to the query can identify one or more content servers 110 as having content potentially related to the query.

In some implementations, the UDP packet is forwarded from the entry server 106 to multiple search servers 108. In some implementations, the UDP packet is further routed from one search server to other search servers. The search servers can send partial replies to the client, where the partial replies include information related to the query. The partial replies can also be further routed with the query to other search servers. In some implementations, a search server aggregates a last partial reply with the forwarded partial replies and sends a composite reply to the client. The determination that a partial reply is the last reply can be based on, for example, a time limit or the number of hops (i.e., number of times the query is forwarded to another search server).

A query reply including search results from the search server is not routed back through the entry server 106, as with TCP transport. Instead, the search results are transmitted as a DNS reply in one or more UDP packets addressed to the DNS agent 204 bypassing the entry server 106. The search server 108 is able to bypass the entry server 106 en route to the client 202, because the search server 108 received the client identification information (i.e., IP address and port number) with the query request. Additionally, the search server 108 can adopt the identification information of the entry server 106 so that the query reply appears to originate from the entry server 106 (e.g., the search server 108 can spoof the entry server 106).

In some implementations, the search results can be transmitted using a protocol other than UDP such as, for example, TCP or a tunneling protocol. The type of protocol used to transmit the search results can depend on the security concerns, the reliability requirements, the latency requirements, and the network conditions between the search server 108 and the DNS agent 204.

Upon receipt of the query reply at the client 202, the user's browser renders the reply content including, for example, search results. The search results provided in the UDP reply include URL links that can include anchor text. The number of search result URLs provided can be limited to a maximum number (e.g., four or five) dependent on the size of the UDP payload. Additionally, the search results can also include IP addresses for the returned URLs, eliminating the need for the DNS agent 204 to resolve a domain name if any of the addressed URL links are selected by the user for further viewing. In some implementations, the number of search results returned to the client 202 is limited by the UDP-based search protocol. For example, the UDP-based search protocol can limit the reply to a single packet such that the number of search results is limited by the size of the packet.

Figure 3:
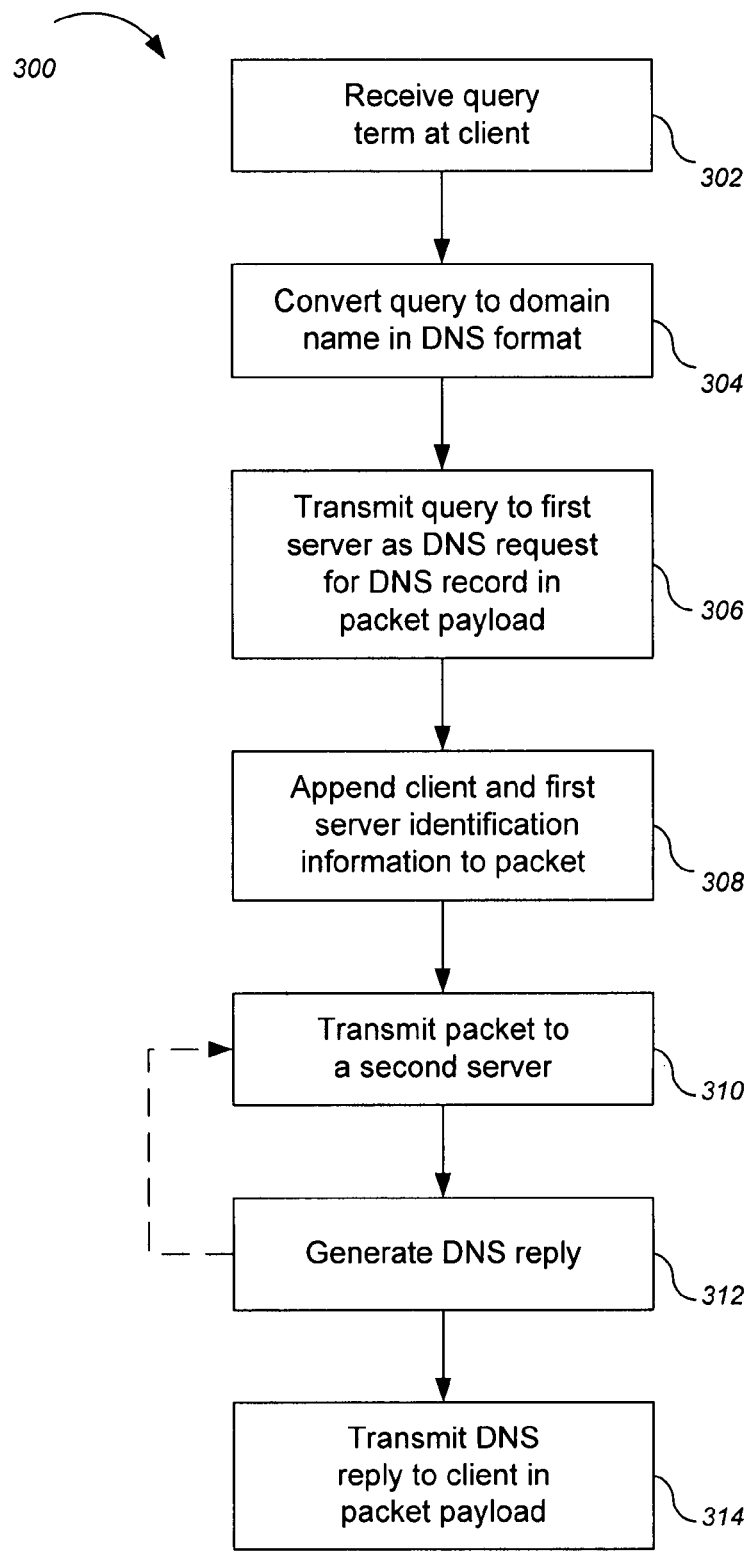
FIG. 3 illustrates an example process for routing a search query using UDP transport.

FIG. 3 illustrates an example process 300 for routing a search query using UDP transport. For convenience, the process will be described with reference to a system that performs the process 300. As shown in FIG. 3, the client receives a search query with one or more terms (step 302). For example, a user can input a search query to a client application (e.g., by entering the search terms in a quick search field on a toolbar of the client browser). As an illustration, the user could input term1 and term2 as search terms.

The client converts the query into text that looks like a domain name in a DNS format (step 304). The formatted domain name can include a suffix and the one or more query terms as a prefix. The suffix can be a domain name or a hostname. For example, the client application can convert the search terms term1 and term2 into DNS syntax by prefixing the search terms to a Google™ domain name (e.g., term1.term2.abc.google.com where abc.google.com is the suffix used with search queries). In some implementations, the suffix is associated with a first server (e.g., a destination entry server) using a nameserver (NS) record or a service location (SRV) record. Alternatively, in some implementations, the formatted domain name does not include a suffix. In some implementations, the client application uses underscores for queries requesting exact matching of the query terms, for example, term1_term2.abc.google.com.

The client transmits the query to the first server as a DNS request for a DNS record in the payload of a UDP packet (step 306). In some implementations, the query is transmitted to designated DNS servers which are configured to accept prefixed domain names. In some implementations, the designated DNS servers are also configured to accept the formatted domain name query without a suffix. For example, the server identified as a nameserver for the domain abc.google.com may be a designated first server because it is configured to accept query terms, such as term1 and term2, as prefixed search terms.

The UDP packet is sent in the form of a DNS request of a particular record type, e.g., a TXT record for text results. Other possible requested or returned DNS record types include an "A" record for URL IP addresses, a NULL record for binary data, and a SRV record for a server name and port to be used with the next query. The UDP header of the DNS request includes the client's IP address and port number. In some implementations, one or more DNS servers are used to resolve (e.g., using a standard DNS recursion) the IP address corresponding to the first server identified by the domain name (e.g., the particular IP address for a nameserver for abc.google.com). Alternatively, the IP address can be a well-known preconfigured anycast IP address that is assigned to multiple machines in diverse locations.

After the first server's IP address is found, the UDP packet is sent to the first server. The first server extracts the DNS formatted query from the UDP packet. For example, the server for the domain abc.google.com can extract the prefixed search terms, term1 and term2, from the DNS formatted query. If search results are already locally cached, the first server answers the query (e.g., by sending a UDP reply including search results to the client).

If the first server does not have locally cached search results, the first server can run a decision algorithm to determine whether the first server should respond to the query or forward the query to another server. Prior to forwarding the query, the first server appends the UDP packet with information identifying the client and the first server (step 308). In some implementations, the appended information includes the IP addresses and port numbers of both the client and the first server. Port numbers can distinguish between different requests issued from the same IP address. For example, the port number can be used to distinguish between multiple requests made by concurrently running applications (e.g., a browser and an e-mail application) running on a single host.

The first server transmits the UDP packet with the appended identifying information to a second (e.g., a search or query) server to respond to the query (step 310). In some implementations, the first server uses an algorithm to identify a particular second server to respond to the query. Different second servers can have access to different portions of a database. For example, the particular second server identified can have access to the portion of the database containing information related to the query. These second servers can have varying latencies, for example, according to the current load of the second server and the network conditions between the second server and the client. In some implementations, the first server identifies a particular second server using latency data received from multiple second servers. Alternatively, in some implementations, dynamic load balancing is used to identify the particular second server to respond to the query. More than one second server may be needed to respond to the query. Therefore, the query can be forwarded from one second server to another second server, with partial replies sent to the client and subsequent servers in the process.

The second server performs the search using the query terms, e.g., term1 and term2. The second server generates a DNS reply in response to the query (step 312). The DNS reply to the DNS request is in the form of the particular record type requested, e.g., as a TXT record including a number of search result URLs and associated anchor text. Alternatively, the second server formats the result packets using different DNS record types, such as an "A" record or a NULL record. If the record type requested is an "A" record, for example, the DNS reply can include IP addresses for URL links with content related to the query.

The DNS reply can include one or more search results. In some implementations, the maximum number (e.g., four or five) of search result URLs or the maximum number of bytes of information provided in response to the query is preconfigured or defined by the client. The DNS reply can include service location information of a particular search server. For example, the second server can include in the DNS reply the IP address and port number for a particular search server. If this occurs, the client would direct subsequent queries to the IP address and port number, eliminating the need to resolve a domain name and allowing the subsequent queries to bypass the first server.

The second server transmits the DNS reply to the client in the payload of one or more UDP result packets (step 314). The DNS reply can be transmitted to the client, bypassing the first server. The client then displays the search results which may include, for example, URLs, anchor text, images, and advertising.

As an example illustrating the process 300 shown in FIG. 3, a user could input mountain and bikes as query terms in a quick search field on a toolbar of a client browser. The client converts the query to a domain name in DNS format:

mountain.bikes.abc.google.com.

The client transmits the query to a first server as a DNS request for a particular DNS record type, e.g., a TXT record.

The client receives the query reply in the payload of one or more UDP result packets according to the requested DNS record type, e.g., a TXT record. For example, the query reply to the mountain and bikes query with a request for a TXT record could include both URLs and anchor text:

"www.mtbkrv.com/" "Product reviews for mountain bikes"

"www.mtnbikingmag.com/" "Mountain Biking Magazine"

"www.peeweebikes.com/" "PeeWee Mountain Bikes"

"www.bikegalore.com/" "Everything Mountain Bikes"

"www.svmba.org/" "SVMBA—Silicon Valley Mountain Bicycling Association"

"www.biking-mount-tam.com/" "Mount Tamalpais Bicycles"

In some implementations, the number of search results can be limited, for example, by the number and size of UDP packets used to transport the query reply. The requested DNS record type limits the types of data which can be included in the search results. For example, for a requested TXT record, the search results can include, for example, only URLs and anchor text without layout or graphics data. If the user's browser has cached information associated with the layout and graphics of a search results page, the browser can supplement the rendered search results with this cached information.

Figure 4:
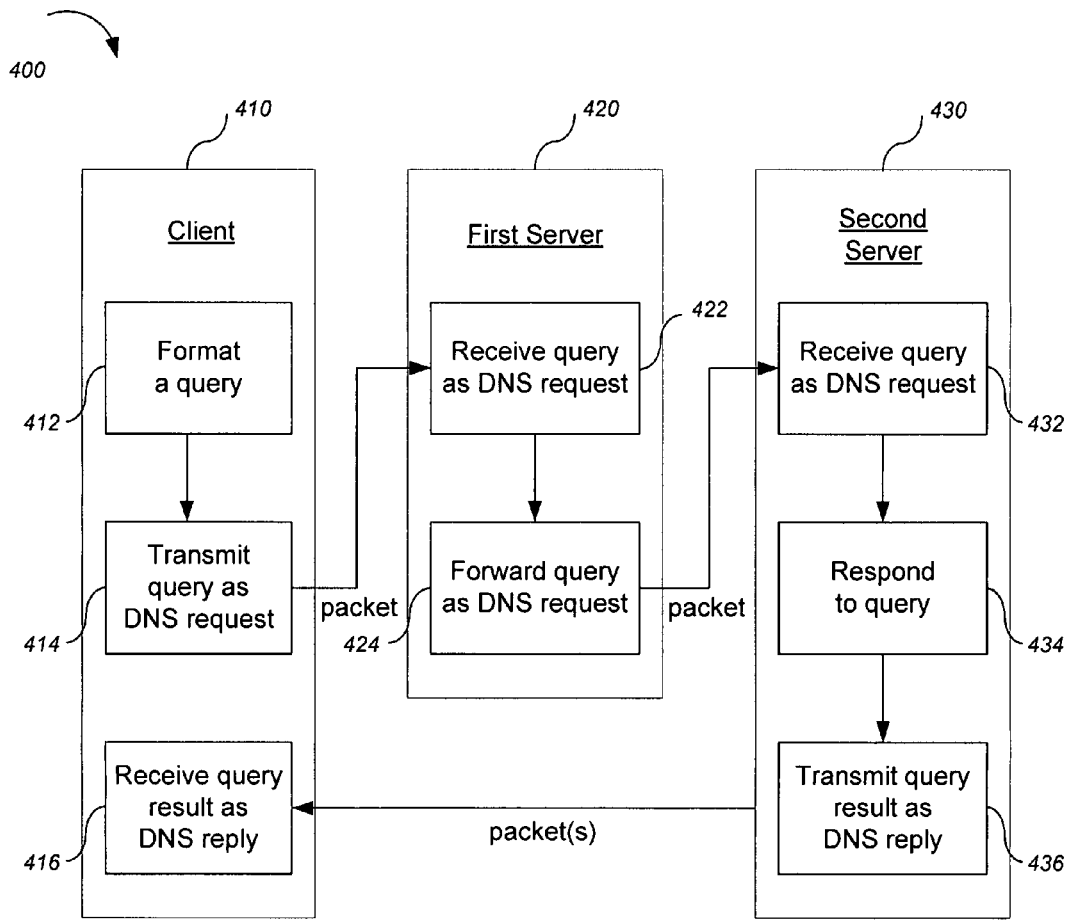
FIG. 4 is a block diagram illustrating a system for routing a search query using UDP transport.

FIG. 4 is an example block diagram 400 illustrating a system for routing a search query using UDP transport. The system includes a client 410, a first server 420, and one or more second servers 430.

A DNS agent at the client 410 formats a query (step 412) as a domain name in a DNS format. The client 410 transmits the formatted query as a DNS request (step 414) for a DNS record of a particular type, e.g., a TXT record. The client 410 transmits the DNS request as a UDP packet to a first server 420.

The first server 420 receives the query as a DNS request (step 422) from the client 410. In some implementations, the first server 420 extracts the query from the DNS request. The first server 420 generally forwards the query as a DNS request (step 424) to a second server. The first server 420 forwards the query as a UDP packet and includes identifying information of both the client 410 and the first server 420. In some implementations, the query can be forwarded using a protocol other than UDP, e.g., TCP or a tunneling protocol.

In some implementations, the first server 420 selects a particular second server from the one or more second servers 430 to respond to the client query. The first server 420 can select the particular second server using, for example, latency data received from the multiple second servers 430, as described above.

A second server 430 receives the query as a DNS request (step 432). The second server 430 services the query by, for example, identifying one or more content servers having content associated with the query. The second server 430 responds to the query (step 434) by assembling a DNS reply containing the query results. The second server 430 transmits the DNS reply (step 436) to the client in one or more UDP packets. The second server 430 uses the identifying information of the first server 420 as the spoofed transmitting address and the identifying information of the client 410 as the target address. The DNS agent at the client 410 receives the DNS reply, which bypasses the first server 420, directly from the second server 430 (step 416).

In some implementations, steps are taken to mitigate denial-of-service (DoS) attacks. For example, the entry server can be implemented to accept queries only from DNS servers hosted by trusted parties. Alternatively, subsequent queries sent by suspected malicious users could be redirected to ports designated to receive suspected queries, isolating the suspected queries. These ports can be shut down if necessary. Additionally, the query can be encrypted or a digital signature can be attached to certify that the query is from a legitimate user. Furthermore, service of suspected queries using UDP transport can be gracefully degraded to use shorter replies and less computation (e.g., serving only cached answers), to send authentication requests, or to redirect the suspected queries to a standard TCP-based service.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some implementations, an application layer protocol other than DNS can be used. Additionally, a connectionless transport layer protocol other than UDP can be used. In certain circumstances, searches can be implemented in a peer-to-peer system that stores or caches served information.

What is claimed is:

1. A computer-implemented method comprising:
   receiving a search query entered in a search engine input field by a user on a client, the search query including at least one term;
   appending a domain suffix to the at least one term to convert the search query into a form of a domain name in a domain name system (DNS) format, where the domain suffix is associated with a first server;
   transmitting the converted query as a DNS request for a DNS record to the first server associated with the domain suffix, where the DNS request is transmitted in a payload of a User Datagram Protocol (UDP) packet;
   appending information identifying the client and the first server to the UDP packet;
   transmitting the UDP packet from the first server to one or more second servers;
   generating one or more DNS replies in response to the converted query; and
   transmitting the one or more DNS replies from the one or more second servers to the client in the payload of one or more UDP packets, the transmitted replies bypassing the first server.

2. The method of claim 1, where the DNS reply comprises one or more search results, the one or more search results being content related to the search query.

3. The method of claim 1, where transmitting the converted query as a DNS request includes transmitting the converted query to designated DNS servers, the designated DNS servers configured to accept terms appended with domain suffixes.

4. The method of claim 1, where the appended information identifying the client and the first server includes respective Internet Protocol (IP) addresses and port numbers of each of the client and the first server.

5. The method of claim 1, where generating one or more DNS replies further includes adding to one or more replies service location information identifying a particular server, the service location information directing subsequent queries from the client to the particular server identified by the service location information.

6. The method of claim 1, where transmitting the UDP packet to one or more second servers further comprises receiving latency data from a group of servers and using the latency data to identify the one or more second servers from the group of servers.

7. The method of claim 1, further comprising forwarding the UDP packet from one of the one or more second servers to another second server.

8. A computer-implemented method comprising:
receiving a search query entered in a search engine input field by a user on a client, the search query including at least one term;
appending a domain suffix to the at least one term to convert the search query into a form of a domain name in a domain name system (DNS) format, where the domain suffix is associated with a destination server;
transmitting the converted query as a DNS request for a DNS record to the destination server associated with the domain suffix in the converted query, where the DNS request is transmitted in the payload of a User Datagram Protocol (UDP) packet including an Internet Protocol (IP) address and port number of the client; and
receiving query results in a DNS reply, where the query results are provided in a payload of one or more UDP packets and where the DNS reply is received from a server different from the destination server.

9. A computer-implemented method comprising:
at a client, encoding a search query, entered in a search engine input field by a user, into a form of a domain name in a domain name system (DNS) format including appending a domain suffix to the search query, where the domain suffix is associated with a destination server;
resolving the domain suffix to determine an Internet Protocol (IP) address for the destination server;
transmitting a User Datagram Protocol (UDP) packet to the IP address for the destination server, the UDP packet containing the encoded query as a DNS request for a DNS record for a domain name that corresponds to the domain suffix, the UDP packet containing an IP address and a port number for the client; and
receiving query results in a DNS reply to the DNS request at the client from a query server processing the search query.

10. A computer-implemented method comprising:
receiving at a first server a converted query, where the converted query is formatted as a domain name in a domain name system (DNS) request, where the converted query includes a domain suffix appended to a search query entered in a search engine input field by a user on a client, and where the converted query received in a User Datagram Protocol (UDP) packet as a DNS request;
adding information identifying the client and the first server to the UDP packet; and
forwarding the UDP packet to a second server, where the second server generates a DNS reply in response to the converted query and transmits the DNS reply to the client in a payload of one or more UDP packets, the transmitted reply bypassing the first server.

11. A computer program product, encoded on a tangible machine-readable storage device, operable to cause data processing apparatus to perform operations comprising:
receiving a search query entered in a search engine input field by a user on a client, the search query including at least one term;
appending a domain suffix to the at least one term to convert the search query into a form of a domain name in a domain name system (DNS) format, where the domain suffix is associated with a first server;
transmitting the converted query as a DNS request for a DNS record to the first server associated with the domain suffix, where the DNS request is transmitted in the payload of a User Datagram Protocol (UDP) packet;
appending information identifying the client and the first server to the UDP packet;
transmitting the UDP packet from the first server to one or more second servers;
generating one or more DNS replies in response to the converted query; and
transmitting the one or more DNS replies from the one or more second servers to the client in a payload of one or more UDP packets, the transmitted replies bypassing the first server.

12. The computer program product of claim 11, where the DNS reply comprises one or more search results, the one or more search results being content related to the search query.

13. The computer program product of claim 11, where transmitting the converted query as a DNS request includes transmitting the converted query to designated DNS servers, the designated DNS servers configured to accept terms appended with domain suffixes.

14. The computer program product of claim 11, where the appended information identifying the client and the first server includes respective Internet Protocol addresses and port numbers of each of the client and the first server.

15. The computer program product of claim 11, where generating one or more DNS replies further includes adding to one or more replies service location information identifying a particular server, the service location information directing subsequent queries from the client to the particular server identified by the service location information.

16. The computer program product of claim 11, where transmitting the UDP packet to one or more second servers further comprises receiving latency data from a group of servers and using the latency data to identify the one or more second servers from the group of servers.

17. The computer program product of claim 11, further comprising forwarding the UDP packet from one of the one or more second servers to another second server.

18. A computer program product, encoded on a tangible machine-readable storage device, operable to cause data processing apparatus to perform operations comprising:
receiving a search query entered in a search engine input field by a user on a client, the search query including at least one term;
appending a domain suffix to the at least one term to convert the search query into a form of a domain name in a domain name system (DNS) format, where the domain suffix is associated with a destination server;
transmitting the converted query as a DNS request for a DNS record to the destination server associated with the domain suffix in the converted query, where the DNS request is transmitted in a payload of a User Datagram Protocol (UDP) packet including an Internet Protocol (IP) address and port number of the client; and receiving query results in a DNS reply, where the query results are provided in the payload of one or more UDP packets and where the DNS reply is received from a server different from the destination server.

19. A computer program product, encoded on a tangible machine-readable storage device, operable to cause data processing apparatus to perform operations comprising:

at a client, encoding a search query, entered in a search engine input field by a user, into a form of a domain name in a domain name system (DNS) format including appending a domain suffix to the search query, where the domain suffix is associated with a destination server;

resolving the domain suffix to determine an Internet Protocol (IP) address for the destination server;

transmitting a User Datagram Protocol (UDP) packet to the IP address for the destination server, the UDP packet containing the encoded query as a DNS request for a DNS record for a domain name that corresponds to the domain suffix, the UDP packet containing an IP address and a port number for the client; and receiving query results in a DNS reply to the DNS request at the client from a query server processing the search query.

20. A computer program product, encoded on a tangible machine readable storage device, operable to cause data processing apparatus to perform operations comprising:

receiving at a first server a converted query, where the converted query is formatted as a domain name in a domain name system (DNS) request, where the converted query includes a domain suffix appended to a search query entered in a search engine input field by a user on a client, and where the converted query is received in a User Datagram Protocol (UDP) packet as a DNS request;

adding information identifying the client and the first server to the UDP packet; and forwarding the UDP packet to a second server, where the second server generates a DNS reply in response to the converted query and transmits the DNS reply to the client in a payload of one or more UDP packets, the transmitted reply bypassing the first server.

21. A system comprising:

a client operable to format a search query, entered in a search engine input field by a user, as a domain name in a domain name system (DNS) format including appending a domain suffix to the search query, the client being further operable to transmit the formatted query as a DNS request for a DNS record in a User Datagram Protocol (UDP) packet;

a first server operable to receive the DNS request from the client, the first server being operable to forward the DNS request, where the domain suffix is associated with the first server; and one or more second servers operable to receive the DNS request from the first server, each second server being operable to respond to the formatted query with a DNS reply transmitted to the client as one or more UDP packets without passing through the first server.

22. A system comprising:

one or more computers and one or more storage devices storing instructions that when executed by the one or more computers cause the one or more computers to perform operations comprising:

receiving a search query entered in a search engine input field by a user on a client, the search query including at least one term;

appending a domain suffix to the at least one term to convert the search query into a form of a domain name in a domain name system (DNS) format, where the domain suffix is associated with a destination server;

transmitting the converted query as a DNS request for a DNS record to the destination server associated with the domain suffix in the converted query, where the DNS request is transmitted in a payload of a User Datagram Protocol (UDP) packet including an Internet Protocol (IP) address and port number of the client; and receiving query results in a DNS reply, where the query results are provided in the payload of one or more UDP packets and where the DNS reply is received from a server different from the destination server.

23. A system comprising:

one or more computers and one or more storage devices storing instructions that when executed by the one or more computers cause the one or more computers to perform operations comprising:

at a client, encoding a search query, entered in a search engine input field by a user, into a form of a domain name in a domain name system (DNS) format including appending a domain suffix to the search query, where the domain suffix is associated with a destination server;

resolving the domain suffix to determine an Internet Protocol (IP) address for the destination server;

transmitting a User Datagram Protocol (UDP) packet to the IP address for the destination server, the UDP packet containing the encoded query as a DNS request for a DNS record for a domain name that corresponds to the domain suffix, the UDP packet containing an IP address and a port number for the client; and receiving query results in a DNS reply to the DNS request at the client from a query server processing the search query.

24. A system comprising:

one or more computers and one or more storage devices storing instructions that when executed by the one or more computers cause the one or more computers to perform operations comprising:

receiving at a first server a converted query, where the converted query is formatted as a domain name in a domain name system (DNS) request, where the converted query includes a domain suffix appended to a search query entered in a search engine input field by a user on a client, and where the converted query is received in a User Datagram Protocol (UDP) packet as a DNS request;

adding information identifying the client and the first server to the UDP packet; and forwarding the UDP packet to a second server, where the second server generates a DNS reply in response to the converted query and transmits the DNS reply to the client in a payload of one or more UDP packets, the transmitted reply bypassing the first server.

* * * * *

UNITED STATES PATENT AND TRADEMARK OFFICE
CERTIFICATE OF CORRECTION

| | | |
|---|---|---|
| PATENT NO. | : 7,882,268 B1 | Page 1 of 1 |
| APPLICATION NO. | : 11/701608 | |
| DATED | : February 1, 2011 | |
| INVENTOR(S) | : Andre Broido | |

It is certified that error appears in the above-identified patent and that said Letters Patent is hereby corrected as shown below:

In Claim 10, column 11, line 63, after "query" insert -- is --.

Signed and Sealed this
Fourteenth Day of June, 2011

David J. Kappos
*Director of the United States Patent and Trademark Office*